United States Patent Office 3,481,937
Patented Dec. 2, 1969

3,481,937
POLYCYCLIC INDOLE DERIVATIVES
Ulrich Renner, Riehen, and Daniel A. Prins, Basel Land, Switzerland, assignors to Geigy Chemical Corporation, Ardsley, N.Y., a corporation of New York
No Drawing. Continuation-in-part of application Ser. No. 436,640, Mar. 2, 1965. This application July 31, 1967, Ser. No. 657,033
Claims priority, application Switzerland, Mar. 4, 1964, 2,701/64
Int. Cl. C07d 39/00, 41/00; A61k 27/00
U.S. Cl. 260—293
21 Claims

ABSTRACT OF THE DISCLOSURE

Indolo [3',2'-d]-1-azabicyclo[6,3,1]dodecane derivatives and acid addition salts thereof which have useful central depressant activity. Processes for the production of these compounds comprising the reaction of a reactive ester of an alcohol with an acid binding agent, which alcohol may be obtained by reducing a naturally occurring ester of the type of coronaridine, and optional reduction of the resulting product. An illustrative embodiment is indolo [3',2'-d]-6-methylene-10-ethyl-10,11-dehydro-1-azabicyclo[6,3,1]dodecane which is obtained from the reaction of the p-toluene sulfonate of the alcohol coronaridinol with triethylamine, and which may be further reduced to indolo [3',2'-d]-6-methylene-10-ethyl-1-azabicyclo[6,3,1]dodecane or indolo[3',2'-d] - 6 - methyl-10-ethyl-1-azabicyclo[6,3,1]dodecane, the latter compounds also being illustrative embodiments of the invention.

CROSS REFERENCE TO RELATED APPLICATIONS

This application is a continuation-in-part of our copending application Ser. No. 436,640, filed Mar. 2, 1965, now abandoned.

This invention relates to polycyclic indole derivatives having valuable pharmacological properties. More particularly the invention pertains to indolo[3',2'-d]-1-azabicyclo[6,3,1]dodecane derivatives and to acid addition salts thereof. The invention is further concerned with processes for the production of these compounds and these addition salts.

Indolo[3',2'-d] - 1 - azabicyclo[6,3,1]dodecane derivatives which in free base form are of the formula

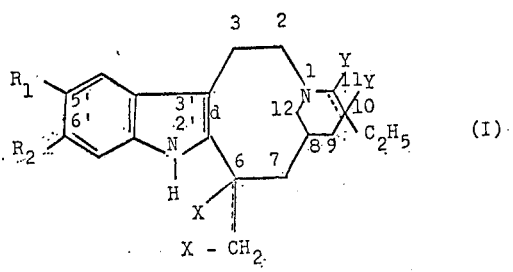

(I)

wherein each of $R_1$ and $R_2$ represents hydrogen or methoxy, and both X and both Y represent hydrogen or at least both X, or both X and both Y, represent an additional bond corresponding to the dotted lines, and their addition salts with inorganic or organic acids, have not been known up to now.

These compounds as well as their acid addition salts have now been found to unexpectedly exhibit valuable pharmacological properties, among which there are, in particular, depressant action on the central nervous system, reduction of motility and production of catalepsy, which may be determined pharmacologically in warm-blooded animals. These pharmacological properties together with their favorable therapeutic index render the inventive compounds and their pharmaceutically acceptable acid addition salts well suited as calmatives, e.g. in the treatment of situational anxiety, for which purpose they may be administered orally or, in the form of aqueous solutions of appropriate pharmaceutically acceptable acid addition salts thereof, also parenterally, in amounts depending on the species, age and weight of the subject under treatment as well as on the particular condition to be treated and, of course, the mode of administration; in general these compounds or their pharmaceutically acceptable acid addition salts may be administered, for instance, in daily amounts of about 10 to 250 mg.

A preferred embodiment of the invention are those compounds of Formula I, and their pharmaceutically acceptable acid addition salts, wherein both X and both Y represent hydrogen and each of $R_1$ and $R_2$ represents hydrogen or methoxy; compounds and salts thereof within this preferred embodiment wherein in Formula I at least one of $R_1$ and $R_2$ represents methoxy and both pairs of symbols X, X and Y, Y represent hydrogen are particularly useful because of their prolonged calmative action.

The pharmacological action of the inventive compounds may illustratively be demonstrated, for example, by means of the test described by G. Malorny, Arzneimittelforschung 5,252 (1955), and/or the test described by G. Zetler and E. Moog, Naunyn-Schmiedebergs Archiv für experimentelle Pathologie und Pharmakologie 232,247 (1958).

In the test described by G. Malorny the locomotive activity of mice through the number of released contacts is determined. On administration of the indolo[3',2'-d]-1-azabicyclo[6,3,1]dodecanes of the invention, particularly of the compounds of the above Formula I wherein both X and both Y represent hydrogen and each of $R_1$ and $R_2$ represents hydrogen or methoxy, in form of their hydrochlorides in amounts of from about 10 mg./kg. to about 50 mg./kg. s.c. the motility of the test animals is reduced up to 50% as compared with untreated controls.

Administered to mice in amounts of from about 15 mg./kg. to 30 mg./kg. i.p., these compounds cause acinesia or catalepsy which is determined in the test according to G. Zetler et al. by putting the test animals to a vertical rod. In the given dosage range, up to 100% of the animals remain cataleptic.

For administration purposes preferably therapeutic compositions are used consisting essentially of a compound according to the invention, or a pharmaceutically acceptable addition salt thereof with an inorganic or organic acid, in combination with a pharmaceutical carrier and, if desired, further additives. These compositions are presented for oral or parenteral administration in solid and liquid dosage units, such as tablets, dragees (sugar coated tablets), capsules, ampoules, and the like.

Suitable dosage units for the oral administration such as dragees (sugar coated tablets), tablets or capsules, preferably contain as active ingredient 10–50 mg. of an inventive compound or a pharmaceutically acceptable acid addition salt thereof. In these dosage units the amounts of active ingredient is preferably 1% to 90%.

To produce tablets or dragee cores, the active substance is combined with, e.g. solid pulverulent carriers such as lactose, saccharose, sorbitol or mannitol: starches such as potato starch, maize starch or amylopectin, also laminaria powder or citrus pulp powder; cellulose derivatives or gelatine, optionally with the addition of lubricants such as magnesium or calcium stearate or polyethylene glycols of suitable molecular weights, to form tablets or dragee cores. The latter are coated, e.g. with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between different dosages of active substance.

Other suitable oral dosage units are hard gelatine capsules as well as soft, closed capsules made from gelatine and a softener such as glycerol. The former contain the active substance and the carrier, preferably as a granulate, in admixture with lubricants such as talcum or magnesium stearate and, optionally, appropriate stabilisers. In soft capsules, the active substance is preferably dissolved or suspended in suitable liquid carriers such as liquid polyethylene glycols: stabilisers can also be added.

Ampoules for parenteral, particularly intramuscular and also subcutaneous administration, preferably contain as active ingredient a water soluble pharmaceutically acceptable acid addition salt of an inventive compound, the carrier being water. The concentration of the active ingredient is preferably between 0.5% and 10%. If necessary, suitable stabilising agents and/or buffer substances are added to the ampoule solutions.

The following non-limitative examples describe the production of typical administration forms:

(A) *Tables.*—250 g. of active substance, e.g. 6'-methoxy - indolo[3',2',d] - 6 - methyl - 10-ethyl-1-azabicyclo [6,3,1]dodecane is mixed with 175.80 g. of lactose and 169.70 g. of potato starch, the mixture is moistened with an alcoholic solution of 10 g. of stearic acid and granulated through a sieve. After drying, 160 g. of potato starch, 200 g. of talcum, 250 g. of magnesium stearate and 32 g. of colloidal silicon dioxide are mixed in and the mixture is pressed into 10,000 tablets each weighing 100 mg. and containing 25 mg. of active substance. If desired, the tablets can be grooved to attain better adaptation of the dosage.

(B) *Dragees.*—A granulate is produced from 250 g. of active substance, e.g. 5', 6'-dimethoxy-indolo[3',2'-d]-6-methyl-10-ethyl-1-azabicyclo[6,3,1]dodecane, 175.90 g. of lactose and the alcoholic solution of 10 g. of stearic acid. After drying, 56.60 g. of colloidal silicon dioxide, 165 g. of talcum, 20 g. of potato starch and 2.50 g. of magnesium stearate are mixed in and the whole is pressed into 10,000 dragee cores. These are then coated with a concentrated syrup made from 502.28 g. of crystallized saccharose, 6 g. of shellack, 10 g. of gum arabic, 0.22 g. of dyestuff and 1.5 g. of titanium dioxide and dried. Each of the dragees obtained weighs 120 mg. and contains 25 mg. of active substance.

(C) *Capsules.*— 250 g. of active substance, e.g. indolo[3',2' - d] - 6 - methyl - 10 - ethyl - 1 - azabicyclo-[6,3,1]dodecane, is well mixed with 442.8 g. of potato starch and 295.2 g. of lactose, the mixture is moistened with an alcoholic solution of 30.0 g. of stearic acid and granulated through a sieve. After drying, this granulate is mixed with 96.0 g. of talcum, 80.0 g. of potato starch and 6.0 g. of magnesium stearate and the mixture obtained is again granulated through a sieve. This granulate serves as filling for 10,000 hard gelatine capsules each weighing 120 mg., and each of the capsules so obtained containing 25 mg. of active substance.

(D) *Ampoules.*—10 g. of active substance, e.g. 5'-methoxy - indolo[3',2' - d] - 6 - methyl - 10 - ethyl - 1 - azabicyclo[6,3,1]dodecane hydrochloride, are dissolved in distilled water up to a volume of 1 litre. This solution is used to fill ampoules, each of 1 ml., containing 10 mg. of active substance.

The preparation of the new substances of Formula I comprises a novel chemical process which consists, according to another aspect of the invention, in treating, mixing and preferably heating, and thereby causing to react, a reactive ester of an alcohol of the formula

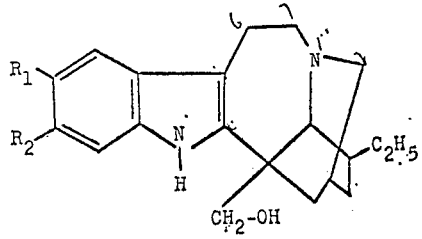

(II)

in an inert solvent or diluent with an acid binding agent, as defined below, and is followed, if desired, by reducing the product formed until one or two molar equivalents of hydrogen have been taken up.

That this process leads to compounds falling under Formula I in good yields is unexpected for, on treating reactive esters of alcohols, in particular of primary alcohols, with bases either substitution or elimination is to be expected, i.e. the ester group should either be replaced by the radical of a base while an acid is generated, or it should be split off together with a vicinal hydrogen atom, whereby a double bond would be formed. If there is no vicinal hydrogen atom, then elimination would be expected to take place with rearrangement, e.g. by expansion or contraction of a ring system. Very surprisingly, in the present case neither the above-mentioned substitution nor elimination with rearrangement occur; rather, products are obtained that have two double bonds instead of only one, as expected. These novel products are formed without rearrangement of the ring structure and thus possess structural characteristics which could in no way have been foreseen.

The alcohols of Formula II can be obtained by reduction of esters of the formula

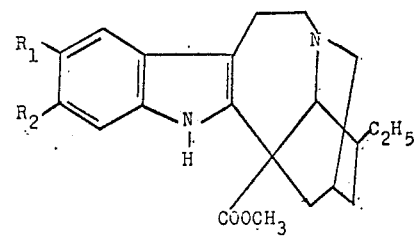

(III)

wherein $R_1$ and $R_2$ have the meanings given above, by means of complex hydrides in ether-like solvents, e.g. by means of lithium aluminium hydride in diethyl ether or tetrahydrofuran. This reduction, like the subsequent conversion of the resulting alcohols into the corresponding amorphous p-toluene sulfonates, has been described for a compound embraced by Formula II, by F. Percheron, Ann. de Chimie, 4, (13), 342–343, (1959).

Certain optically active forms of substances of the Formula III—coronaridine ($R_1$ and $R_2$=H), voacangine ($R_1$=OCH$_3$, $R_2$=H), isovoacangine ($R_1$=H, $R_2$= OCH$_3$) and conopharyngine ($R_1$ and $R_2$=OCH$_3$)—occur in nature and can be isolated by known processes from plants of various species of the sub-genus Tabernaemontaninae of the Apocynaceae family, for example from Voacanga species such as *V. africana* STAPF, and from Conopharyngia species such as *C. durissima* STAPF.

Examples of reactive esters of compounds of Formula II are esters with oxygen acids, such as lower alkyl sulfates, lower alkyl sulfonates and mononuclear carbocyclic aryl sulfonates, also "activated carboxylic acid" esters such as trifluoroacetates and nitrobenzoates. The use of crystalline p-toluene-sulfonates derived from alcohols of Formula II is advantageous.

Reactive esters of primary alcohols of Formula II, e.g. the p-toluene-sulfonates, are produced in a manner known per se by reacting these alcohols with acid halides or anhydrides in the presence of a base, e.g. pyridine or collidine, the reaction being performed at temperatures below 20° C, preferably below 0° C.

The reaction of reactive esters of compounds of Formula II with acid binding agents is performed in heterogeneous or, preferably, homogenous phase at room temperature or, optionally at an elevated temperature, preferably between 50 and 120° C., and preferably in an inert atmosphere, e.g. under nitrogen.

Inorganic and organic bases can be used as acid binding agents, e.g. alkali and alkaline earth hydroxides, carbonates and lower alkanolates of alkali metals, also amines such as lower mono-, di- and trialkylamines, lower aminoalkanols such as 2-aminoethanol, lower alkylenediamines such as ethylenediamine, polymethyleneimines have 5–7 ring members such as piperidine, 1-(lower alkyl)-polymethyleneimines such as 1-methyl pyrrolidine and 1-ethyl piperidine. It is critical to employ bases having a dissociation constant $K_B$ greater than $1.10^{-5}$. Bases with lower dissociation constants do not afford satisfactory results.

Examples of inert solvents or diluents which can be used are: liquid aliphatic or aromatic hydrocarbons having a boiling point between 50 and 150° C. such as hexanes, heptanes and octanes, also benzene, toluene and the xylenes, in addition lower alkanols, lower alkyl ethers such as diethyl and dibutyl ether, as well as ether-like substances such as tetrahydrofuran and dioxan.

The reduction of double bonds in the compounds of Formula I obtained according to the invention in which both pairs of symbols X, X and Y, Y each represent an additional bond, can be performed by chemical or catalytic methods. For example, complex metal hydrides in inert solvents, e.g. alkali metal borohydrides such as sodium borohydride in lower alkanols such as methanol are suitable for chemical reduction. The dihydro derivatives so obtained correspond to Formula I wherein $R_1$ and $R_2$ have the meanings given, the pair of symbols X, X represents an additional bond and both Y represent hydrogen atoms. These substances are suitable as intermediate products for further syntheses. Catalytic hydrogenation is preferably used to produce indolo[3',2'-d]-1-azabicyclo[6,3,1]dodecanes of the Formula I wherein $R_1$ and $R_2$ have the meanings given, and both pairs of symbols X, X and Y, Y represent hydrogen atoms, i.e. to produce tetrahydro derivatives.

This hydrogenation is performed by using catalyst such as palladium or platinum which, if desired, can be distributed on an inert carrier such as charcoal or barium sulphate, and by using inert solvents such as lower alkanols or dioxan; it is completed after 2 mol equivalents of hydrogen have been taken up.

The terms "lower alkyl" and "lower alkanol" used in this description refer to alkyl groups or alkanols which contain not more than 6 carbon atoms.

The new free bases falling under Formula I form salts, some of which are water soluble, with inorganic and organic acids such as hydrochloric acid, hydrobromic acid, sulfuric acid, nitric acid, phosphoric acid, methane sulfonic acid, ethane disulfonic acid, β-hydroxyethane sulfonic acid, acetic acid, propionic acid, maleic acid, fumaric acid, lactic acid, malic acid, tartaric acid, citric acid, benzoic acid, salicylic acid, phenylacetic acid and mandelic acid. These salts are pharmaceutically acceptable and can serve instead of the free bases as active substances for therapeutic compositions: other salts can be of use, for example, in an intermediate state on purifying by recrystallization or for storing the compounds of Formula I.

The following non-limitative examples further illustrate the invention. The temperatures therein are given in degrees centigrade.

EXAMPLE 1

(a) 7.3 g. of voacanginol (cf. F. Percheron, Ann. de Chimie 4, (13), 342–343 [1959]) are dissolved in 75 ml. of dry pyridine, the solution is cooled to −15° C. and 11 g. of p-toluene-sulfonyl chloride are added while swirling the solution. The reaction mixture is kept at 0° C. for about 5 hours. 10 ml. of concentrated ammonia solution are added to 500 ml. of ice water and the reaction mixture is then poured into the ice water while stirring. After leaving to stand for a short time, the precipitate formed is filtered off under suction, washed with ammoniated water and water, dried for a short time in a desiccator under vacuum and crystallised from a little cold methanol. 9.0 g. of crystalline voacanginol p-toluene sulfonate are obtained which melts at 135–140° C. (with decomposition). The product is used for the following reactions without further crystallisation.

(b) 5.1 g. of voacanginol p-toluene sulfonate are dissolved in 50 ml. of abs. benzene in an atmosphere of nitrogen, a solution of 2.25 g. of triethylamine in 20 ml. of abs. benzene is added and the mixture is refluxed for 2 hours in an atmosphere of nitrogen. The benzene is then distilled off in vacuo and the residue is crystallised from a little methanol. 2.55 g. of colorless crystals of 5'-methoxy-indolo[3',2'-d]-6-methylene - 10 - ethyl-10,11-dehydro-1-azabicyclo[6,3,1]dodecane are obtained which melt at 198–202° C.

The structural formula of this compound is the following:

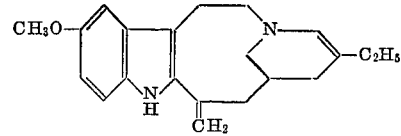

On catalytical hydrogenation (cf. Example 2) 2 mols of hydrogen are taken up. Thus, in contrast to the starting material, the substance contains two double bonds which can be hydrogenated. One of these is part of a 2-vinyl indole chromophore as can be seen from the UV spectrum: $\lambda_{max}$ in methanol 222 and 309 mμ; log ε 4.41 and 4.18. The IR spectrum (KBr pellet) shows strong bands at 2.92μ (indole-NH), 5.61 and 11.23μ ($CH_2=C<$) and 6.02μ ($C=C$ as part of an enamine grouping). In methylene chloride the carbon-carbon double bond of the enamine grouping is indicated by a bond at 6.02μ.

In the above example piperidine can be used instead of triethylamine.

(c) Isovoacangine, coronaridine and conopharyngine can also be reduced by the process described by F. Percheron to form the corresponding alcohols of general Formula II which can be termed isovoacanginol, coronaridinol or conopharynginol.

From these corresponding p-toluene sulphonates are obtained analogously to stage (a) of the above example. On treating these p-toluene sulphonates with triethylamine in benzene analogously to stage (b) described above, 6'-methoxy - indolo[3',2'-d]-6-methylene - 10 - ethyl - 10,11-dehydro-1-azabicyclo[6,3,1]dodecane, indolo[3',2'-d] - 6-methylene-10-ethyl-10,11-dehydro - 1 - azabicyclo[6,3,1] dodecane or 5',6'-dimethoxy - indolo[3',2'-d]-6-methylene-10-ethyl-10,11-dehydro-1-azabicyclo[6,3,1]dodecane, respectively are obtained.

EXAMPLE 2

(a) 2.58 g. of 5'-methoxy-indolo[3',2'-d]-6-methylene-10 - ethyl - 10,11-dehydro-1-azabicyclo[6,3,1]dodecane in 100 ml. of dioxan are hydrogenated at room temperature (23–24° C.) under normal pressure (750 torr) in the presence of 300 mg. of Pd-C (5%). After about 6½ hours 100.2% (359 ml.) of the amount of hydrogen theoretically required for the saturation of two double bonds, 358 ml., has been absorbed. The catalyst is filtered off, the filtrate is evaporated to dryness in vacuo and the residue is crystallised from methanol, 2.2 g. of colourless crystals of 5'- methoxy-indolo[3',2'-d]-6-methyl-10-ethyl-1-azabicyclo[6,3,1]dodecane are obtained which melt at 153–154°; $[\alpha]_D^{24}+98.6°$ (c.=0.5 in CHCl$_3$).

This compound is of the formula:

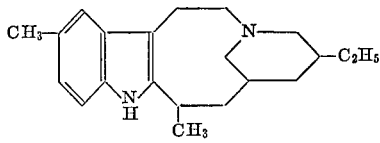

UV spectrum: $\lambda_{max}$ 230 and 291 m$\mu$; log $\epsilon$ 4.42 and 3.97 (in methanol);

IR spectrum: in CH$_2$Cl$_2$ bands at 2.91$\mu$ (indole-NH), no strong bands between 6 and 6.5$\mu$.

Kuhn-Roth oxidation: 67% of two terminal carbon-bound methyl groups were found (found 5.72% C—CH$_3$ on C$_{21}$H$_{30}$N$_2$O).

(b) The hydrochloride salt of the free base of the formula given above in this example is obtained by dissolving the free base in acetone and adding thereto an ether solution of hydrochloric acid saturated in the cold, whereupon the hydrochloride salt precipitates and is separated by filtration, washed with acetone and dried.

(c) From the reaction products mentioned in Example 1 under (c), 6'-methoxy-indolo[3',2'-d]-6-methyl-10-ethyl-1-azabicyclo[6,3,1]dodecane, indolo[3'2'-d]-6-methyl-10-ethyl-1-azabicyclo[6,3,1]dodecane or 5',6'-dimethoxy-indolo[3',2'-d]-6-methyl-10-ethyl-1-azabicyclo[6,3,1]dodecane are obtained in an analogous manner.

EXAMPLE 3

(a) 5 g. of 5'-methoxy-indolo[3',2'-d]-6-methylene-10-ethyl-10,11-dehydro-1-azabicyclo[6,3,1]dodecane and 2.8 g. of potassium borohydride are suspended, while stirring, in 100 ml. of abs. methanol. The mixture is stirred for 9 hours at room temperature whereby first the reactants slowly dissolve and then, after about 3–4 hours, a crystalline reaction product begins to separate out. After 3, 5 and 7 hours, additional portions of 0.5 g. of potassium borohydride are added each time. On completion of the reaction, 1,000 ml. of water are added to the mixture which is then extracted with two portions of 500 ml. of ether each. The combined ether extracts are washed with water, dried over sodium sulfate and evaporated to dryness. The residue (4.7 g.) is recrystallised from ether whereupon 3.9 g. of 5'-methoxy-indolo[3',2'-d]-6-methylene-10-ethyl-1-azabicyclo[6,3,1]dodecane of the formula:

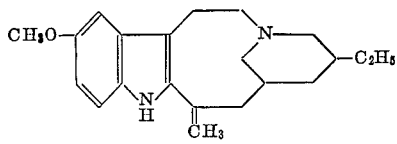

are obtained as colourless small needles which melt at 142–144°. Methanol can also be used for crystallisation.

UV Spectrum: $\lambda_{max}$ 217 and 312 m$\mu$; log $\epsilon$ 4.36 and 4.27 (in methanol);

IR Spectrum (KBr pellet): bands at 2.91 (indole-NH), 5.60 and 11.2$\mu$ (CH$_2$=C<).

(b) From the reaction products mentioned in Example 1 under (c), and working analogously to (a) above, 6'-methoxy-indolo[3',2'-d]-6-methylene-10-ethyl-1-azabicyclo[6,3,1]dodecane, indolo[3',2'-d]-6-methylene-10-ethyl-1-azabicyclo[6,3,1]dodecane or 5',6'-dimethoxy-indolo[3',2'-d]-6-methylene-10-ethyl-1-azabicyclo[6,3,1]dodecane, respectively, are obtained.

Acid addition salts of the inventive compounds obtained according to Examples 1–3 be prepared analogous to methods well known in the art; the hydrochlorides of these compounds are e.g. produced in the same manner as is described in more detail in Example 2(b) for 5'-methoxy-indolo[3',2'-d]-6-methyl-10-ethyl-1-azabicyclo[6,3,1]dodecane hydrochloride.

What is claimed is:

1. A compound of the formula

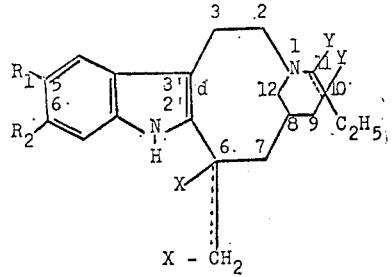

wherein each of R$_1$ and R$_2$ represents hydrogen or methoxy, and both X and both Y represent hydrogen or at least both X, or both X and both Y, represent an additional bond corresponding to the dotted lines.

2. A non-toxic pharmaceutically acceptable acid addition salt of a compound as defined in claim 1.

3. A compound as defined in claim 1 of the formula

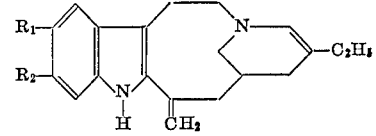

wherein each of R$_1$ and R$_2$ is hydrogen or methoxy.

4. A non-toxic pharmaceutically acceptable acid addition salt of a compound as defined in claim 3.

5. A compound as defined in claim 1 of the formula

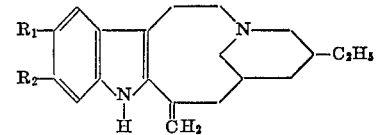

wherein each of R$_1$ and R$_2$ is hydrogen or methoxy.

6. A non-toxic pharmaceutically acceptable acid addition salt of a compound as defined in claim 5.

7. A compound as defined in claim 1 of the formula

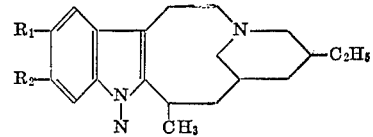

wherein each of R$_1$ and R$_2$ is hydrogen or methoxy.

8. A non-toxic pharmaceutically acceptable acid addition salt of a compound as defined in claim 7.

9. A compound as defined in claim 3 of the formula

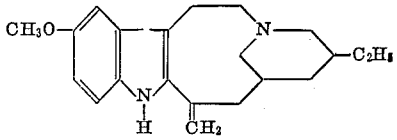

10. A compound as defined in claim 3 of the formula

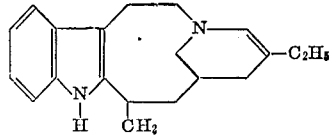

11. A compound as defined in claim 3 of the formula

[structure: 6,7-dimethoxy indole fused azocine with =CH2 and N-C2H5]

12. A compound as defined in claim 3 of the formula

[structure: 6-methoxy indole fused azocine with =CH2 and N-C2H5]

13. A compound as defined in claim 5 of the formula

[structure: 7-methoxy indole fused azocine with =CH2 and N-C2H5]

14. A compound as defined in claim 5 of the formula

[structure: indole fused azocine with =CH2 and N-C2H5]

15. A compound as defined in claim 5 of the formula

[structure: 6,7-dimethoxy indole fused azocine with =CH2 and N-C2H5]

16. A compound as defined in claim 5 of the formula

[structure: 6-methoxy indole fused azocine with =CH2 and N-C2H5]

17. A compound as defined in claim 7 of the formula

[structure: 7-methoxy indole fused azocine with CH3 and N-C2H5]

18. A compound as defined in claim 7 of the formula

[structure: indole fused azocine with CH3 and N-C2H5]

19. A compound as defined in claim 7 of the formula

[structure: 6,7-dimethoxy indole fused azocine with CH3 and N-C2H5]

20. A compound as defined in claim 7 of the formula

[structure: 6-methoxy indole fused azocine with CH2 and N-C2H5]

21. A process for producing a compound of the formula

[structure with $R_1$, $R_2$ substituents, indole fused azocine, =CH2 and N-C2H5]

wherein each of $R_1$ and $R_2$ is hydrogen or methoxy, comprising mixing and thereby causing to react (a) a reactive ester of an alcohol of the formula

[structure with $R_1$, $R_2$, indole, $CH_2-OH$, $C_2H_5$]

wherein $R_1$ and $R_2$ have the aforesaid meanings,
the anion moiety of which ester is selected from among lower alkyl sulfate, lower alkyl sulfonate, mononuclear carbocyclic aryl sulfonate, trifluoroacetate and nitrobenzoate anions, and (b) an alkaline acid binding agent having a dissociation constant above $1.10^{-5}$, in an organic solvent having a boiling point ranging from about 50 to 150° C. and being inert with regard to the reactants (a) and (b), and recovering the resulting compound from the reaction mixture.

References Cited

FOREIGN PATENTS 434,281  4/1967  Switzerland.

JOHN D. RANDOLPH, Primary Examiner

U.S. Cl. X.R.

260—296, 294.7, 293.2; 424—263, 267